UNITED STATES PATENT OFFICE.

HENRY W. JOHNS, OF NEW YORK, N. Y.

CEMENT PACKING OR FILLING.

SPECIFICATION forming part of Letters Patent No. 394,275, dated December 11, 1888.

Application filed December 23, 1887. Serial No. 247,139. (No specimens.)

*To all whom it may concern:*

Be it known that I, HENRY W. JOHNS, a citizen of the United States, and a resident of New York city, in the county of New York and State of New York, have invented certain new and useful Improvements in Cement Packing or Filling, of which the following is a specification.

My invention relates to a new and useful non-conducting cement filling or packing, especially adapted for use as a boiler or pipe covering and as a lining or filling for walls, safes, refrigerators, refrigerating-cars, wagons, &c.

For the uses intended by me it is necessary that the filling or lining compound as a whole should be practically fire-proof, although not necessarily absolutely so; that it should be as light in weight as possible, and that it should be porous—that is, having numerous air-cells. I have found that sponge—using, preferably, the cheap varieties or scrap—when disintegrated or divided, as by cutting, picking, or otherwise reducing the size of the pieces, serves the above purposes with exceedingly satisfactory results, and especially so when combined with a due proportion of asbestos to add to its tenacity and fire-proof qualities, and suitable filling or body-giving material—such as infusorial earth, kaolin, &c.—to give the compound the needful density, adding also, when used as a plastic mass applied with a trowel, other suitable adhering or cementing substance—such as plaster-of-paris; and I have found that the following proportions produce very good results: about ten pounds of finely-divided sponge; fifteen pounds of asbestos, preferably in long fibers, although the shorter varieties or granular asbestos may be used; seventy pounds of infusorial earth; forty pounds of kaolin; ten pounds of plaster-of-paris.

Instead of the plaster-of-paris any other suitable cementing or binding material may be employed, in such proportions as may be desired—for example, lime; and instead of the infusorial earth or the kaolin any other suitable filler may be used alone or mixed with the said fillers. Magnesia is very useful for this purpose, acting well as a filler and being exceedingly light in weight, and, moreover, possessing some adhesive properties. When the fire-proof quality is not essential, any other suitable non-fire-proof fibrous substance—such as hair—may be substituted for the asbestos.

The above compound may be wet with water to make it into a plastic state for application with a trowel or equivalent means wherever such application is desired, or it may be used dry—as a filler, for instance, in which case the extra adhesive material may be omitted, if desired; but I prefer, even when dry, to employ plaster-of-paris, lime, or magnesia.

The proportions above given are not arbitrary. They may be altered as desired, and are capable of great variation, conforming to the desired use; and, in fact, when the covering or lining will be subject to much jar or heat, I prefer to increase the quantity of the fibrous and fire-proofing materials. Thus, for instance, for covering for locomotive-boilers I make the proportion of asbestos fiber much greater than above stated. The matter of proportion will, however, be readily determined by those familiar with this art when the special occasion shall arise, and it does not require more full specification herein.

In the employment of the asbestos and sponge in my compounded products I avail myself of a discovery made, so far as I am aware, by myself of the peculiar "adhesive attraction," so called, which exists between the tentacle-like barbs or lashes of common sponge and the fine silk-like fibers of asbestos, whereby when the sponge is brought in contact with the asbestos it lays hold thereon with great tenacity, and when pressed together to even a slight degree their subsequent separation is very difficult. Thus the effect of the union of these two substances in the cement-like mass is to firmly bind and hold the same together better, in fact, than though the sponge were not present and an excess of asbestos or other straight fiber were used, because the sponge particles being usually somewhat larger than the asbestos particles the binding effect on the mass is similar to that which would exist if common cow-hair in plaster had enlargements or knots formed in it, which would prevent the slipping of such fibers in or through the mass when dry.

In order that my present invention may be clearly understood, I desire to differentiate it from that which was patented to me in United States Letters Patent dated June 26, 1888, No. 385,120. In that patent I describe and claim an elastic, light, and exceedingly porous wadding or batting composed, essentially, of fibrous asbestus and fibrous sponge. It had no plaster-like characteristics whatever. In this present case, on the contrary, I mix with the asbestus and sponge the substances above mentioned, which act as fillers or body-givers and as cements, thus constituting a mortar or plaster-like product adapted to use with the trowel when admixed with water.

The plastic mass above described may be compressed into plates, curved or flat, slabs, tubes, blocks, or other forms.

Having described my invention, I claim—

1. A lining, filling, or packing composed of disintegrated sponge and filling and cementing materials mixed together, substantially as set forth.

2. A lining, filling, or packing composed of asbestus and disintegrated sponge with filling and cementing materials, substantially as set forth.

3. A lining, filling, or packing composed of disintegrated sponge mixed with other fibrous strength-giving materials and a cementing material, substantially as set forth.

4. A lining, filling, or packing composed of disintegrated sponge, asbestus, a filling material, and a cementing material all mixed together, substantially as set forth.

5. As a new manufacture, a cement covering, lining, or filling composed of disintegrated sponge, a filling material, and a cementing material compressed into desired forms, substantially as set forth.

6. As a new manufacture, a cement covering, lining, or filling composed of disintegrated sponge, asbestus, a filling, and a cementing material compressed into desired forms, substantially as set forth.

Signed at New York, in the county of New York and State of New York, this 11th day of August, A. D. 1887.

HENRY W. JOHNS.

Witnesses:
PHILLIPS ABBOTT,
C. H. PATRICK.